United States Patent [19]

Moberly

[11] Patent Number: 5,443,295
[45] Date of Patent: Aug. 22, 1995

[54] COLLAPSIBLE CAP FOR A PICKUP TRUCK

[76] Inventor: Christopher R. Moberly, 6609 Pinehurst, Dearborn, Mich. 48126

[21] Appl. No.: 188,540

[22] Filed: Jan. 26, 1994

[51] Int. Cl.$^6$ .............................................. B60P 7/02
[52] U.S. Cl. ..................................... 296/105; 296/56; 296/165; 160/180; 49/169
[58] Field of Search ................ 276/56, 100, 104–106, 276/146.8, 156, 164, 163, 165; 49/163, 169; 160/116, 180

[56] References Cited

U.S. PATENT DOCUMENTS

| | | | |
|---|---|---|---|
| 1,859,974 | 5/1932 | Kroenke | 49/169 |
| 1,863,957 | 6/1932 | Woolcott | 296/105 |
| 1,918,475 | 7/1933 | Lassinsky | 296/106 |
| 2,080,762 | 5/1937 | Crawford | 296/104 |
| 2,566,572 | 9/1951 | Lindsey | 296/104 X |
| 3,376,668 | 4/1968 | Smedstad | 296/146.8 |
| 3,606,448 | 9/1971 | Walker | 296/105 |
| 3,688,787 | 9/1972 | Feather | 296/105 X |
| 3,901,548 | 8/1975 | Seaman, Jr. | 296/10 |
| 4,252,363 | 2/1981 | Rodrigue | 296/100 |
| 4,289,346 | 9/1981 | Bourgeois | 296/105 |
| 4,659,136 | 4/1987 | Martin et al. | 296/100 |
| 4,721,336 | 1/1988 | Jones | 296/100 |
| 4,756,325 | 7/1988 | Daniels | 296/105 X |
| 4,789,196 | 12/1988 | Fields | 296/100 |
| 4,944,550 | 7/1990 | Drown | 296/165 X |
| 5,005,896 | 4/1991 | Li | 296/100 |

FOREIGN PATENT DOCUMENTS

| | | | |
|---|---|---|---|
| 47617 | 2/1989 | Japan | 296/106 |
| 283567 | 5/1928 | United Kingdom | 296/105 |
| 504212 | 4/1939 | United Kingdom | 296/105 |

Primary Examiner—Dennis H. Pedder
Attorney, Agent, or Firm—Andrus, Sceales, Starke & Sawall

[57] ABSTRACT

A collapsible cap assembly for a pickup truck or the like includes a pair of track members mounted to the side walls of the pickup truck box, and a series of frame members mounted to the track members. A front frame assembly is stationarily mounted to the track members, and a rear frame assembly and a pair of intermediate frame members are movably mounted to the track members for movement between an extended operative position and a collapsed storage position. A handle is pivotably mounted to the rear frame assembly for assisting in movement of the rear frame assembly and the intermediate frame members between their operative and collapsed positions. A window and door assembly is mounted to the rear frame assembly. The window and door assembly can either be pivoted upwardly and outwardly to provide access to the interior of the cap when in its extended operative position, or pivoted upwardly and inwardly when the cap assembly is moved to its storage condition for providing unobstructed use of the forward portion of the pickup truck box when the cap assembly is collapsed. The invention further includes a simple and unique track system for providing movement of the rear frame assembly and the intermediate frame members between their operative and storage positions, and a removable support rod system for supporting the cover of the cap assembly between the frame members.

7 Claims, 7 Drawing Sheets

COLLAPSIBLE CAP FOR A PICKUP TRUCK

BACKGROUND AND SUMMARY OF THE INVENTION

This invention relates to a cap or cover assembly for a pickup truck or the like, and more particularly to such a cap or cover structure which is movable between an operative position in which the structure encloses the bed of the truck and a collapsed position in which the components of the structure are moved forwardly toward the cab to an inoperative, storage position.

Collapsible pickup truck caps are known, and some examples are illustrated in Feather U.S. Pat. No. 3,688,787; Seaman, Jr. U.S. Pat. No. 3,901,548; Bourgeois U.S. Pat. No. 4,289,346; Rodrigue U.S. Pat. No. 4,252,363; Martin et al U.S. Pat. No. 4,659,136; Jones U.S. Pat. No. 4,721,336; Daniels U.S. Pat. No. 4,756,325; and Li U.S. Pat. No. 5,005,896. Generally, all of these patents disclose a frame assembly mounted to the side walls of the box of a pickup truck, and a cover connected to the frame. The frame components are movable between an operative use position in which the cover encloses the box of the pickup truck, and a storage position in which the frame members and the cover are moved to a collapsed position.

It is an object of the present invention to provide a collapsible cover for a pickup truck box or similar structure, having several unique features which facilitate its construction and operation. A further object of the invention is to provide such a collapsible cap cover assembly which is capable of being easily and quickly moved between its collapsed storage position and it operative use position. A further object of the invention is to provide such a cap assembly which, when in its storage position, does not obstruct use of the forward portion of the pickup truck box.

The invention achieves its objects by incorporating several unique features which are preferably used in combination to facilitate construction and operation of the collapsible cap. Alternatively, certain features of the collapsible cap of the invention may be used alone or in other subcombinations, as desired, in order to address specific user requirements or shortcomings of other similarly constructed collapsible caps.

In all of its aspects, the invention provides a collapsible cap assembly for use with a truck, such as a pickup truck, having a cab and a box extending rearwardly therefrom. The box includes a pair of spaced side walls extending rearwardly from the cab and a rear wall extending between the side walls. The cap assembly includes a front frame member stationarily mounted adjacent the cab and a rear frame member movably mounted to the box side walls between a forward collapsed position and a rearward use position. One or more intermediate frame members are located between the front and rear frame members and are also movable between a forward collapsed position and a rearward use position. A collapsible cover is mounted to the front and rear frame members, and spans the intermediate frame members to enclose the box.

In accordance with one aspect of the invention, a door assembly is movably mounted to the rear frame member. The door assembly is movable between an operative position in which the door and the rear frame member cooperate to enclose the rearward end of the cap assembly between the box rear wall and the cover, and an inoperative position in which a portion of the door is raised upwardly and forwardly relative to the rear frame member above the box side walls. The door assembly can be moved to its inoperative position when the rear frame member is in its forward collapsed position. With this arrangement, pivoting of the door assembly upwardly and forwardly relative to the rear frame member moves the door well above the box so as not to obstruct use of the forward portion of the box when the cap assembly is collapsed. The door assembly is pivotably mounted at an upper edge to the rear frame member through a pivotable mounting member interconnected with the rear frame member. The mounting member and door assembly are pivotable upwardly and rearwardly relative to the rear frame member to an open position for providing access to the interior of the cap assembly. A releasable retainer arrangement, in the form of one or more latch members, is interposed between the door assembly and the front frame member for retaining the door assembly in its storage position when the cap assembly is collapsed and the door assembly is not in use. A cushion member is engageable with the door assembly to prevent the door assembly from vibrating when in its storage position.

In accordance with another aspect of the invention, a handle is mounted to the rear frame member, and is adapted to be grasped by a user to allow the user to move the rear frame member between its forward collapsed position and its rearward use position. The handle is movably mounted to the rear frame member between an inoperative storage position and an operative use position. The handle is connected to the rear frame member so as to be located forwardly of the door and exteriorly of the cover, and includes a pair of side portions and a laterally extending transverse portion. The handle side portions each define upper and lower ends, and the transverse portion extends between the upper ends of the side portions so as to be disposed above the cover when the handle is in its storage position. The handle is preferably pivotably mounted to the rear frame member for movement between its inoperative storage position and its operative use position.

In accordance with yet another aspect of the invention, a pair of cover support members are located one on either side of the cap assembly, with each cover support member being removably engageable between the front and rear frame members and longitudinally extending therebetween when the rear frame member is in its rearward use position. The cover support members function to support the cover between the front and rear frame members and between the intermediate frame members. The cover support members are preferably in the form of collapsible rods which include a tensioning system for providing adjustment of the tension in the cover member. A pocket is mounted to one of the frame members, and the collapsed rods are adapted to be stored within the pocket when the collapsible cap is moved to its collapsed position.

In accordance with a still further aspect of the invention, a track system is interposed between each side wall of the box and the rear and intermediate frame members for facilitating movement of the rear and intermediate frame members between their forward and rearward positions. The track system includes an elongated track member mounted to the side wall of the box, with the track member defining an upper surface. A base, which also functions as a slide member, is mounted to each intermediate frame member and is engageable with the upper surface of the track member. The bases of adjacent intermediate frame members are laterally offset from each other so as to permit the intermediate frame members to move into close proximity with each other when in their forward collapsed positions, such that the bases overlap each other. The base members extend along a front-rear axis forwardly and rearwardly of the intermediate frame members, and each frame member preferably includes a passage for receiving the bases of adjacent frame members so as to allow overlapping of the bases when the cap assembly is in its collapsed position. Preferably, the front and rear frame members also include passages for receiving the bases of the intermediate frame members in order to fully collapse the cap.

As noted previously, the various features as summarized above are preferably incorporated into a single collapsible cap assembly which provides highly satisfactory construction and operation.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
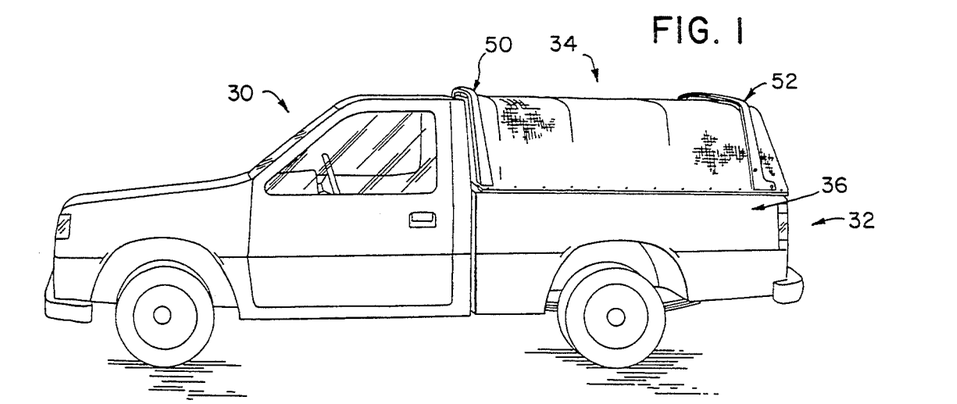
FIG. 1 is an isometric side view showing the collapsible cap assembly of the invention installed over the box of a pickup truck and in its operative condition.

FIG. 1 illustrates a pickup truck having a cab 30 and a box 32 extending rearwardly from cab 30. A collapsible cap assembly, shown generally at 34, is mounted to box 32 for selectively enclosing box 32, in a manner to be explained.

Box 32 is defined by a pair of side walls 36 and a movable tailgate 37 extending between the rear ends of side walls 36.

Figure 2:
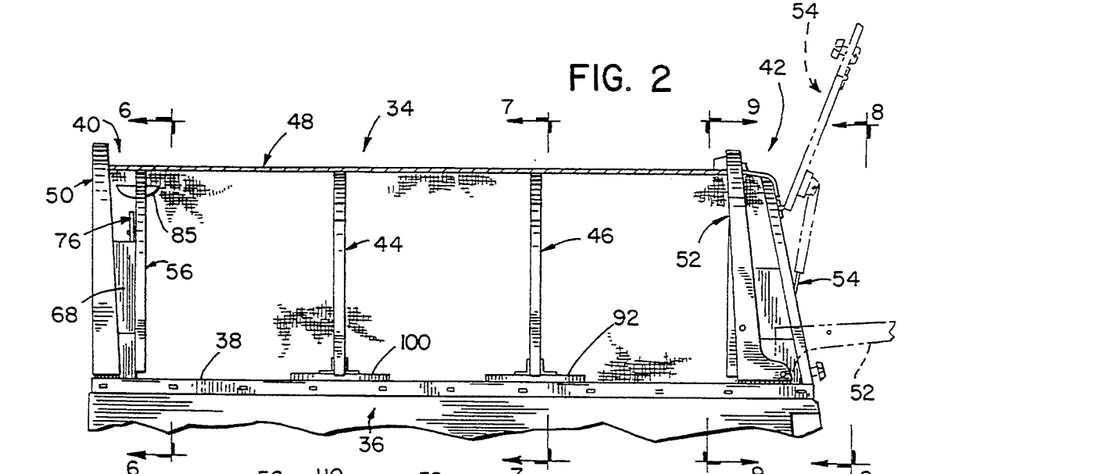
FIG. 2 is a side elevation view of the collapsible cap assembly of FIG. 1, showing the cover removed to illustrate the frame construction.

As shown in FIG. 2, collapsible cap assembly 34 includes a pair of track members 38 rigidly mounted to the upper ends of side walls 36 extending substantially the entire length of side walls 36. A front frame assembly 40 is stationarily mounted to the forward end of track members 38, and a rear frame assembly 42 is movably mounted to track members 38. In FIG. 2, rear frame assembly 42 is shown in its rearwardmost operative position, and in FIG. 3 rear frame assembly 42 is shown in its forwardmost storage position. In a manner to be explained, rear frame assembly 42 is movable on track members 38 between its FIG. 2 and FIG. 3 positions.

A pair of intermediate frame assemblies 44, 46 are mounted between front frame assembly 40 and rear frame assembly 42. A collapsible cover 48 spans between front and rear frame assemblies 40, 42 over intermediate frame assemblies 44, 46 when cap assembly 34 is in its operative position, as shown in FIG. 2, to enclose box 32. When rear frame assembly 42 and intermediate frame assemblies 44, 46 are placed in their FIG. 3 position to collapse cap assembly 34, cover 48 is accordion-folded between frame members 40, 44, 46 and 42. The lower edges of cover 48 are releasably secured to track members 38 by means of a series of mating snaps 49 provided on the outer surface of track members 38 and on cover 48. Any other satisfactory releasable connection arrangement may be provided between cover 48 and track members 38.

Cap assembly 34 further includes a front outer member 50, a handle 52 pivotably mounted to rear frame assembly 42, and a door/window assembly 54 which is also pivotably mounted to rear frame assembly 42.

Figure 6:
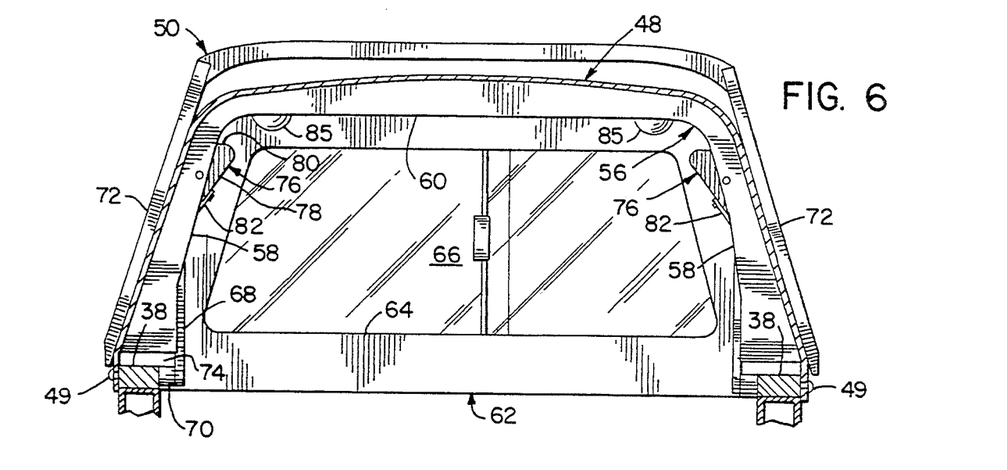
FIG. 6 is a partial sectional view taken along line 6—6 of FIG. 2 showing the front frame member.

Referring to FIGS. 2 and 6, front frame assembly 40 defines a pair of side portions 58 and an upper cross-member 60 extending between the upper ends of side portions 58. A front panel 62 is mounted to the forward ends of track members 38 forwardly of front frame member 56, and includes a cut-out 64 for providing visual access to the interior of box 32 from cab 30 through the rear window 66 of cab 30. Front frame member 56 is mounted to panel 62 through a series of blocks such as 68, 70 which function to space front frame member 56 rearwardly of front panel 62. Front outer member 50 is secured at its sides 72 to the edges of front panel 62 with cover 48 therebetween, for securing cover 48 to front panel 62. Cover 48 is also secured to the upper edge of front panel 62 in any satisfactory manner.

Blocks 68 and 70 function to mount front frame member 56 to track members 38 so as to provide a gap 74 between the lower end of each frame member side portion 58 and the upper surface of each track member 38.

Figure 14:
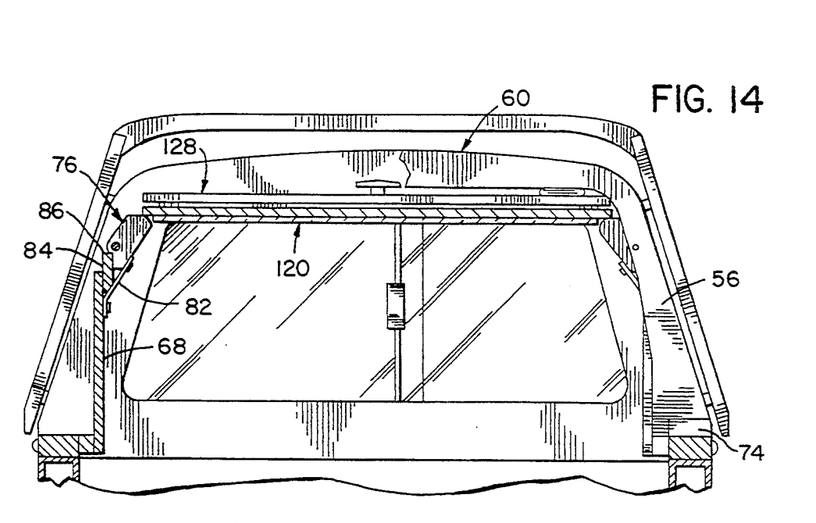
FIG. 14 is a rear elevation view similar to FIG. 8, showing the door assembly pivoted upwardly to its storage position.
Figure 15:
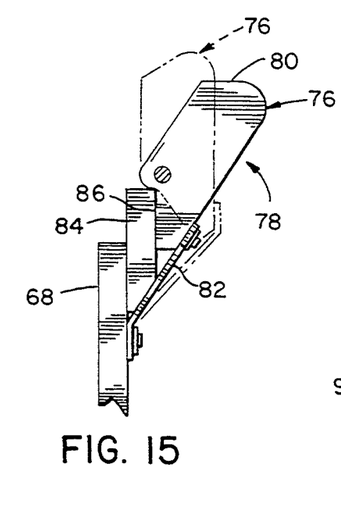
FIG. 15 is a partial rear elevation view of one of the latch members illustrated in FIG. 14 for maintaining the door assembly in its storage position.

A pair of latch members 76 are pivotally mounted to each side portion 58 of front frame member 56. Each latch member 76 defines an angled downwardly facing surface 78 and a horizontal upper support surface 80. Latch members 76 are biased toward their extended positions as shown in FIG. 6 by resilient straps 82 interconnected between each latch member 76 and block 68. Referring to FIGS. 14 and 15, each latch member 76 is maintained in its FIG. 2 position by means of a block 84 mounted to front panel 62 and to block 68 for engaging a stop surface 86 formed on each latch member 76.

A pair of resilient members 85 are mounted to upper cross-member 60 of front frame member 56, extending below the lower edge of cross-member 60.

Figure 7:
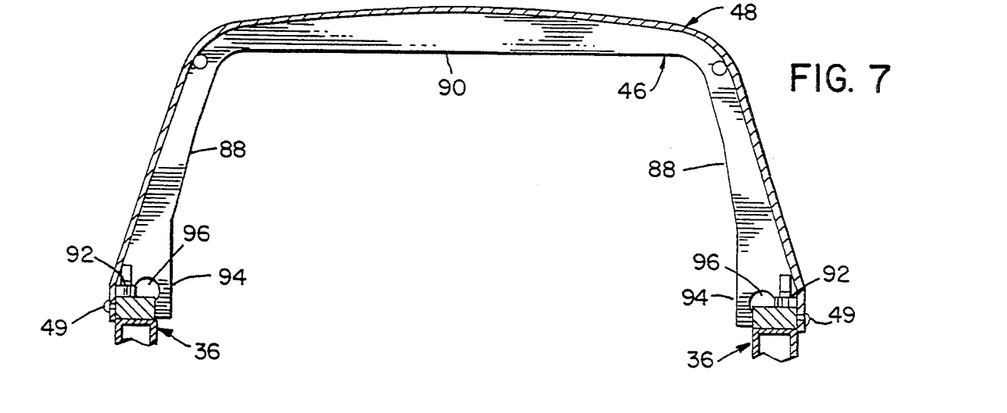
FIG. 7 is a view similar to FIG. 6 taken along line 7—7 of FIG. 2, showing the construction of an intermediate frame member.

As shown in FIG. 7, intermediate frame member 46 includes a pair of side portions 88 and an upper cross-member 90 extending between the upper ends of side portions 88. Cover 48 is secured to the outwardly facing edges of cross-member 90 in any satisfactory manner. A base or slide member 92 is mounted at the lower end of each side portion 88 for engaging the upper surface of track member 38. Each side portion 88 further includes a depending guide 94 which engages the side of each track member 38 for maintaining the desired lateral position of intermediate frame member 46. Slide members 92 are located toward the outer edge of each track member 38, and a passage 96 is located between each slide member 92 and each guide 94 above the inner portion of each track member 38.

Figure 19:
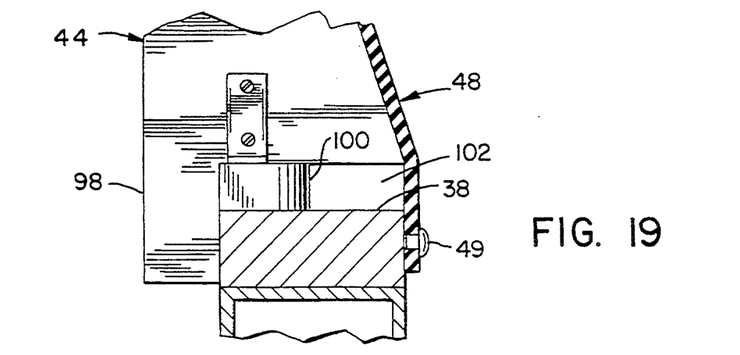
FIG. 19 is a view similar to FIG. 18, showing engagement of the other intermediate frame member with the track.
Figure 20:
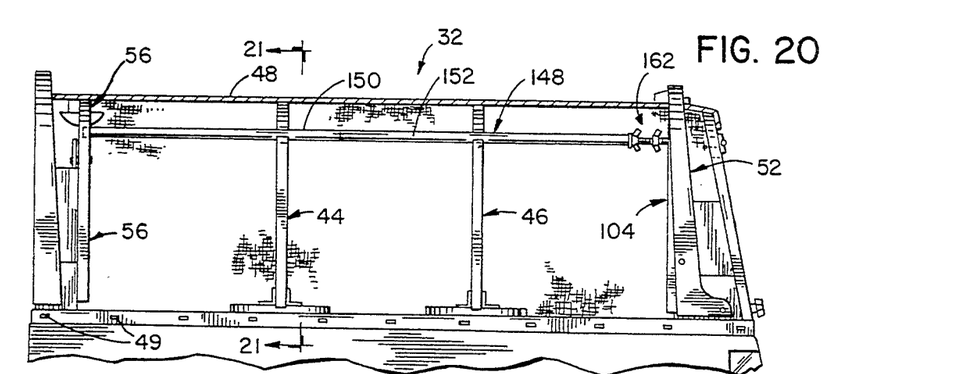
FIG. 20 is a view similar to FIG. 2, showing the front, rear and intermediate frame members and one of the cover support members for supporting the cover between the frame members.

Intermediate frame member 44 is constructed similarly to intermediate frame member 46, with the exception of the construction of the lower ends of its side portions, which is illustrated in FIG. 19. As shown in FIG. 19, the lower side portions of intermediate frame member 44 also includes a depending guide 98 which engages the inner edge of track member 38 for maintaining intermediate frame member 44 in its proper lateral position. A base or slide member 100 is mounted to the lower end of each side portion of frame member 44, and is located toward the inner portion of track member 38 so as to leave a space 102 above the outer portion of track member 38. As also shown in FIG. 19, cover 48 may be secured to the upper outer edge of the intermediate frame members, such as 44, in any satisfactory manner.

Figure 3:
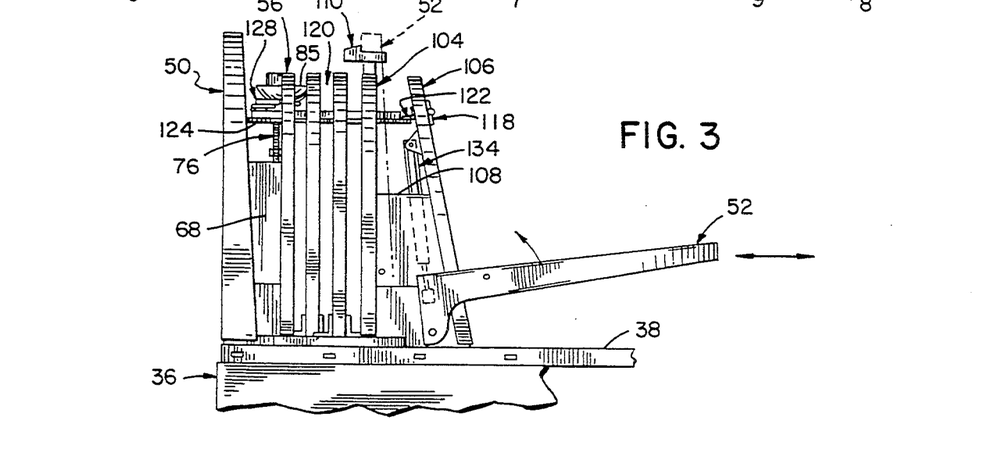
FIG. 3 is a view similar to FIG. 2, illustrating the collapsible cap assembly of FIGS. 1 and 2 in its collapsed condition.
Figure 4:
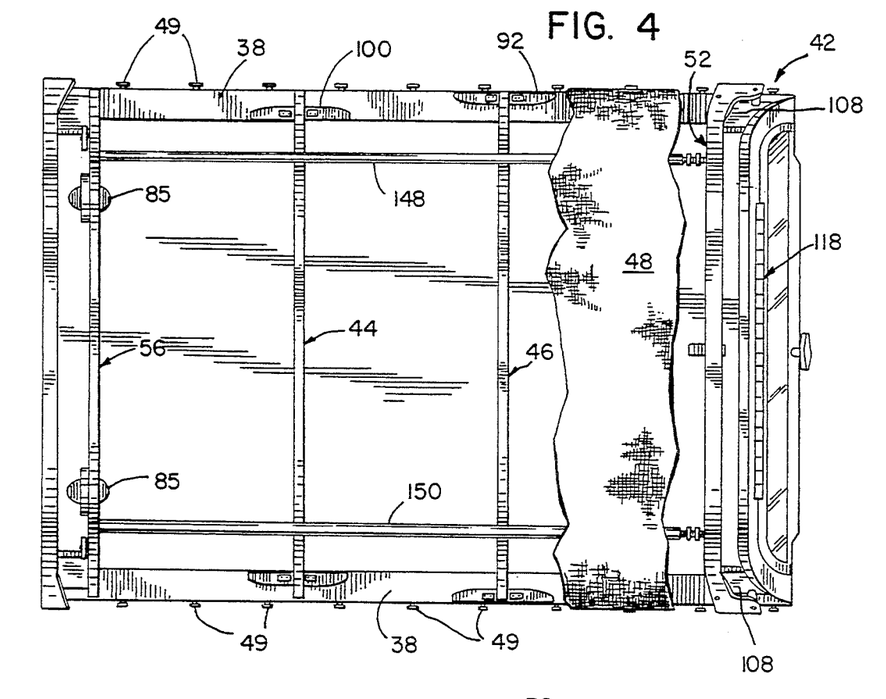
FIG. 4 is a top plan view of the collapsible cap of FIGS. 1-3, with portions broken away to expose the frame structures and showing the cap assembly in its extended, operative condition.
Figure 5:
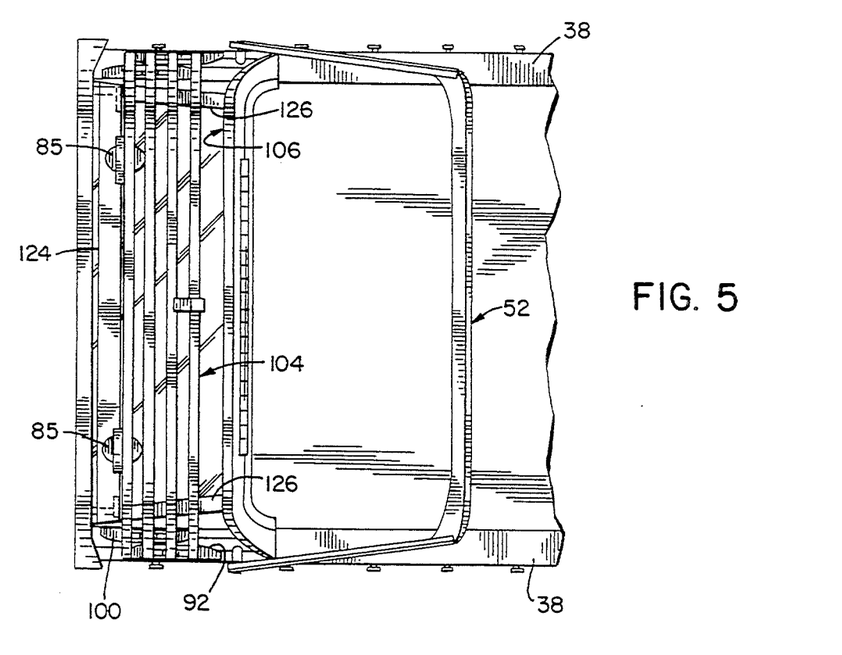
FIG. 5 is a view similar to FIG. 4, showing the collapsible cap assembly in its collapsed condition and showing movement of the handle to its operative use position.

The construction of rear frame assembly 42 is illustrated in FIGS. 2–5 and 8–13. Rear frame assembly 42 includes an inner rear frame member 104 and an outer rear frame member 106 secured together by blocks 108 extending therebetween. Handle 52 is pivotally mounted to blocks 108 for movement between an inoperative storage position as shown in FIG. 2 and an operative use position as shown in FIG. 3. A retainer 110 is mounted to the upper end of inner rear frame member 104 for engaging and retaining handle 52 when in its inoperative storage position.

Figure 8:
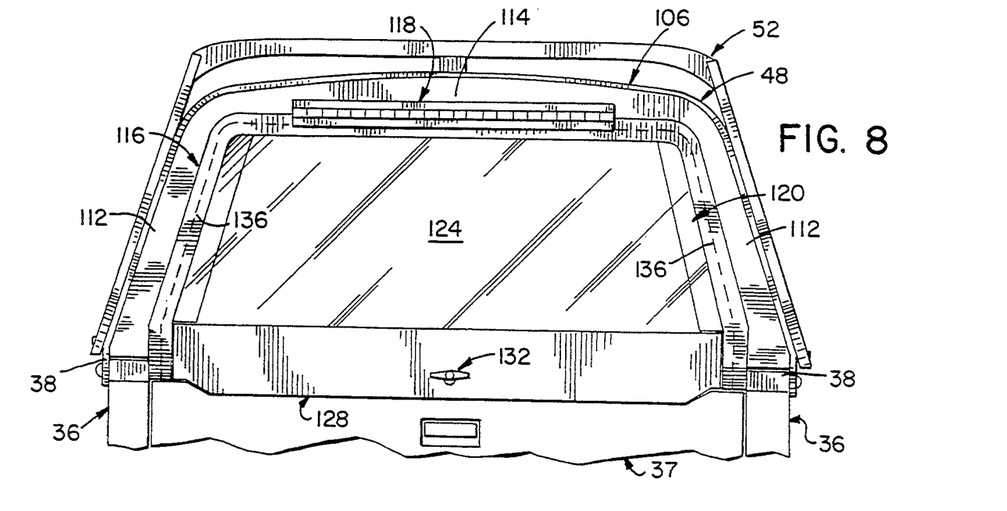
FIG. 8 is a view similar to FIGS. 6 and 7 taken along line 8—8 of FIG. 2, showing the door assembly in its closed position.
Figure 11:
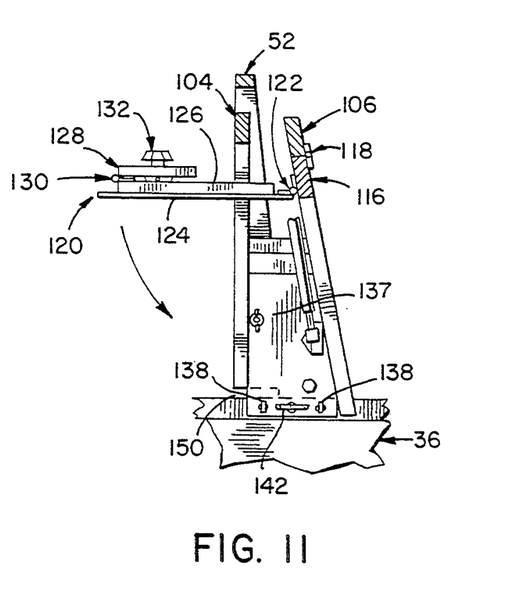
FIG. 11 is a view similar to FIG. 10, showing the door assembly pivoted about the upper movable member upwardly and forwardly to its storage position.

Referring to FIG. 8, outer rear frame member 106 defines a pair of side portions 112 and an upper cross-member 114 extending between the upper ends of side portions 112. Door/window assembly 54 is pivotally mounted to outer rear frame member 106 and includes an inverted U-shaped mounting member 116 pivotally mounted to outer rear frame member 106 via a piano hinge 118. Door/window assembly 54 further includes a window assembly, shown generally at 120 (FIGS. 8, 11) pivotally mounted to mounting member 116 via a piano hinge 122 (FIG. 11). Mounting member 116 is constructed so as to fit within the opening defined by outer rear frame member 106. Generally, window assembly 120 includes a transparent panel 124, formed of plexiglass or the like, a pair of side members 126 connected to the inner surface of panel 124, and a closure panel assembly 128 pivotally mounted to side members 126 via a pair of hinges 130. Closure panel assembly 128 includes a manually operable handle assembly 132 for opening, closing and locking door/window assembly 54. Mounting member 116 is also constructed to overlap portions of transparent panel 124 and indented yet extended portions of closure panel assembly 128 with mounting member 116 being the most rearward facing unit. The non-indented portion of closure panel assembly 128 is flush with mounting member 116 when they are in their operative positions.

A pair of extendible and retractable gas cylinder assemblies 134 are mounted between blocks 108 and the sides of mounting member 116.

Figure 9:
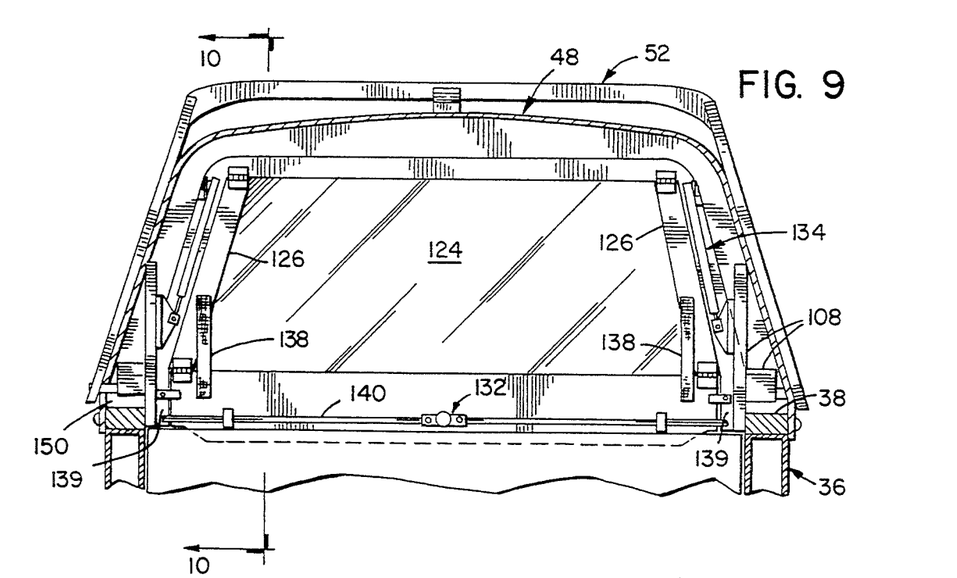
FIG. 9 is a view similar to FIG. 8 taken along line 9—9 of FIG. 2, showing the door assembly in its closed position.

Referring to FIG. 9, a pair of resilient straps 138 are interconnected between window assembly side members 126 and closure assembly 128 to serve as a safety feature to prevent closure panel assembly 128 from unfolding too rapidly when placing closure panel assembly 128 and door/window assembly 154 into their operative positions.

As shown in FIG. 9, blocks 108 serve to maintain the desired lateral position of rear frame assembly 42 relative to box side walls 36 during sliding movement of rear frame assembly 42 between its operative and inoperative positions.

Figure 12:
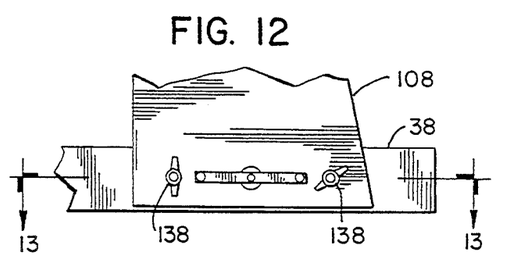
FIG. 12 is partial side elevation view showing the rear frame member and its manner of connection to the track.
Figure 13:
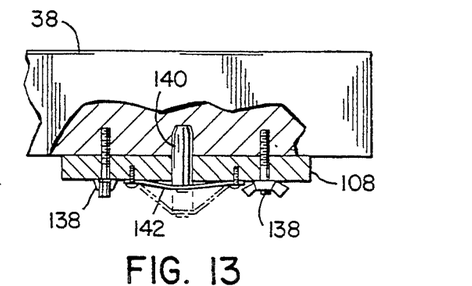
FIG. 13 is a partial sectional view, with portions broken away, taken along line 13—13 of FIG. 12.

FIGS. 12 and 13 illustrate the mechanism by which rear frame assembly 42 is maintained in its operative and storage positions. A pair of manually operable wing bolts 138 are adapted to extend through blocks 108 and into threaded passages formed in track member 38. A pin 140 is mounted to block 108 for sliding inward and outward movement between solid line and phantom line positions illustrated in FIG. 13, and is biased toward its solid line position by a resilient strip 142 secured at its ends to block 108. Pin 140 is adapted to be received within a passage formed in track member 38 for temporarily maintaining block 108 in its operative position until bolts 138 can be secured to track members 38.

Figure 10:
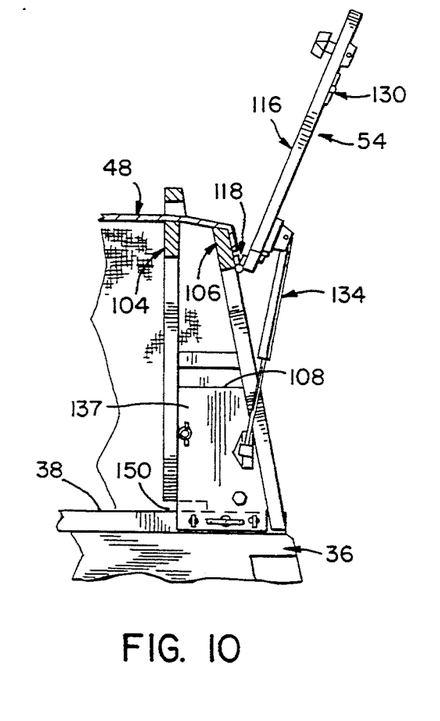
FIG. 10 is a partial side elevation view, with portions in section, showing the door assembly pivoted upwardly and rearwardly to its open position.

In operation, when cap assembly 34 is in its extended, operative position of FIG. 1, the user can gain access to the interior of cap 34 by exerting an upward and outward force on closure panel assembly 128 to open rear door/window assembly 54 to its phantom line position of FIG. 2, and gas cylinders 134 maintain door/window assembly 54 in its open position (also shown in FIG. 10). Door/window assembly 54 is closed by reversing these steps. Alternatively, if desired, the user can pivot window assembly 120 inwardly to its FIG. 11 position to gain access to the interior of cap assembly 34 when in its operative position.

When it is desired to collapse cap assembly 34, the user first folds the overlapping edges of cover 48 upward as they no longer overlap track 38. The user then opens door/window assembly 54. The user then disengages threaded fasteners 138 and pins 140 from track members 38 to allow blocks 108 and thereby rear frame assembly 42 to be disengaged from its longitudinal rearward position. The user then disengages fasteners 137 from handle 52. While disengaging pins 140, the user moves each end of rear frame assembly 42 forward a few inches, so that pins 140 cannot engage into their locking positions and door/window assembly 54 cannot engage tailgate 37 when door/window assembly is closed. The user then closes door/window assembly 54. The user grasps handle 52 and pivots it rearwardly to its use position, as shown in FIG. 3. Using handle 52, the user pushes rear frame assembly 42 forwardly to its FIG. 3 position, which simultaneously moves intermediate frame members 44, 46 to their collapsed, forward positions. As noted previously, while cap assembly 34 is being collapsed, cover 48 is accordion-folded in the spaces between the frame members. The lateral position of rear frame assembly 42 relative to track members 38 is maintained by engagement of the lower ends of blocks 108 with track member 38, with gas cylinders 134 functioning to maintain mounting member 116 in its closed position during such movement of rear frame assembly 42.

Figure 16:
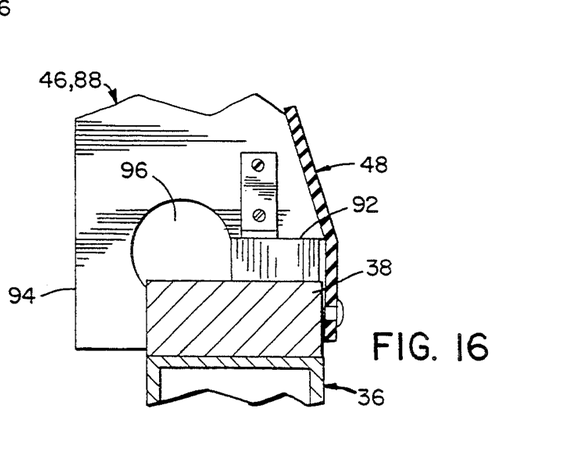
FIG. 16 is an enlarged partial sectional view detailing the track and engagement of the intermediate frame members with the track.

As intermediate frame members 44, 46 are moved forwardly, slide members 92 of intermediate frame member 46 are received within passages 102 (FIG. 19), and slide members 100 of intermediate frame 44 are received within passage 96 (FIGS. 7, 16). Slide members 92, 100 thus overlap each other so as to enable intermediate frame members 44, 46 to be closely adjacent each other when cap assembly 34 is collapsed. The forward ends of slide members 92, 100 are received within passage 74 (FIG. 6), and the rear portions of slide members 92, 100 are received within passages 150 (FIGS. 9, 10, 11) located below the lower ends of the side portions of inner rear frame member 104 and above the upper surface of track members 38. This arrangement enables intermediate frame members 44, 46 to be located closely adjacent front frame member 56 and inner rear frame member 104 when cap assembly 34 is collapsed.

When rear frame assembly 42 is moved to its fully collapsed position, as illustrated in FIG. 3, pins 140 are moved into forward openings formed in track members 38, under the influence of biasing strips 142, to temporarily maintain rear frame assembly 42 in this position. The user then engages bolts 138 with forward threaded passages formed in track member 38 for securing rear frame assembly 42 in its forward position. Handle 52 is then pivoted back to its inoperative storage position, as illustrated in FIG. 3, and engagement of retainer member 110 with the upper transverse portion of handle 52 maintains handle 52 in position. Fasteners 138 are then engaged to connect with side portions of handle 52 in its operative position. Fasteners 138 may either be threaded bolts, as shown or spring-loaded pins. The user then opens door/window assembly 54, and folds the extending portions of cover 48 toward outer rear frame member 106. The fabric of cover 48 may be held in place by using four or more straps which connect from front frame member 56 to rear frame member 106 and its side portions 112 when the frame members are in their collapsed positions. The straps may be fastened to each other in any satisfactory manner. The user then closes door/window assembly 54, and disengages latch members 139 by turning them until they no longer overlap closure panel assembly 128. The user then pivots panel closure assembly 128 upwardly about hinge 130, and pivots window assembly 120 upwardly and forwardly about hinge 122 to its upper horizontal storage position as illustrated in FIGS. 3, 11 and 14. During such upward movement of window assembly 120, the edges of panel 124 engage the angled edges 78 of latch members 76, pivoting latch members 76 outwardly. Once panel 124 has cleared latch members 76, latch members 76 are returned to their latching positions as shown in FIG. 6 under the influence of resilient strips 82, to engage the lower surface of panel 124 and to maintain window assembly 120 in its storage position. Resilient cushions 85 provide sufficient yielding to allow window assembly 120 to clear latch members 76, and also return an amount sufficient to maintain panel 124 in engagement with latch member upper surfaces 80 to prevent window assembly 120 and closure panel assembly 128 from rattling during operation of the pickup truck when window assembly 120 and closure panel assembly 128 are in their storage position.

The upward and forward movement of window assembly 120 to an upper horizontal storage position prevents window assembly 120 from obstructing use of the forward portion of box 32 when cap assembly 34 is in its collapsed condition. This is a significant departure from prior art collapsible cap assemblies which have no provision for moving the door and window assembly, other than to its upward and rearward open position, when the cap assembly is collapsed.

Figure 17:
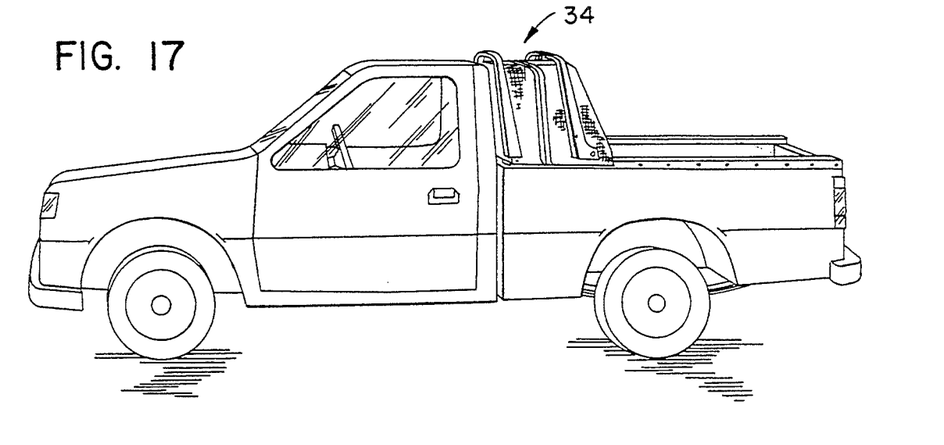
FIGS. 17 and 18 are views similar to FIG. 1, showing the cap assembly in its collapsed position.
Figure 18:
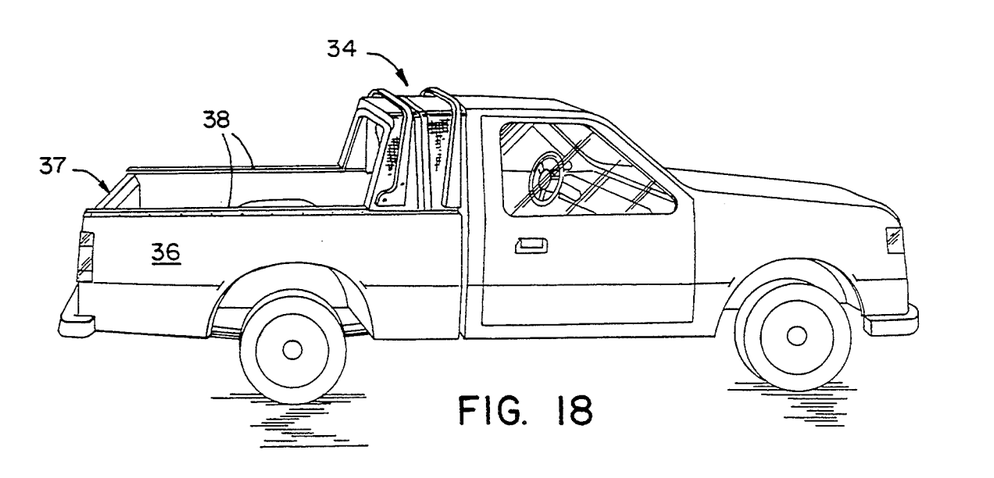

FIGS. 17 and 18 show cap assembly 34 in its closed condition, with FIG. 18 particularly illustrating the feature of cap assembly 34 providing open access to the forward end of box 32 when cap assembly 34 is collapsed.

FIGS. 20-24 illustrate a cover support mechanism for use in supporting cover 48 between front frame member 56, intermediate frame members 44, 46 and inner rear frame member 104. A pair of cover support rod assemblies 148, located one on either side of cap assembly 32, extend between front frame member 56 and inner rear frame member 104. Aligned recesses 150 are formed in intermediate frame members 44, 46 for providing passage of support rod assemblies 148 therethrough. Support rod assemblies 148 each consist of a pair of rod sections 150, 152 secured together by a resilient cable arrangement illustrated in FIG. 24. Rod section 152 includes a ferrule 154 at its end, which is adapted to be received within the adjacent end of rod section 150. An eye hook 156 extends from ferrule 154, and a resilient cable 158, is secured to eye hook 156 and to an eye hook 160 (FIG. 23) mounted at the opposite end of rod section 150.

Figure 23:
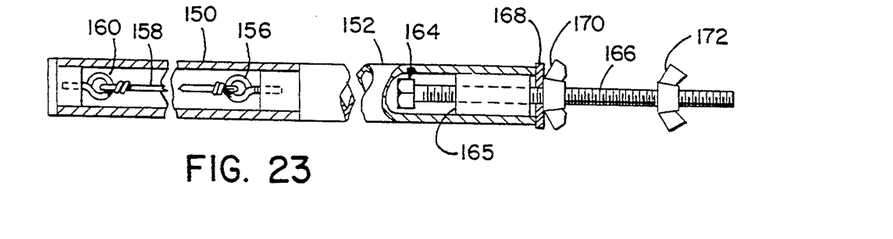
FIG. 23 and FIG. 24 are partial views illustrating the construction of the cover support members illustrated in FIGS. 20-22.

An adjustable length tensioning assembly 162 is mounted to the end of rod section 152 opposite ferrule 154. Referring to FIG. 23, tensioning assembly 162 includes a bolt 164 having a threaded shank 166 extending through a non-threaded passage formed in a block 165 and outwardly from the end of rod section 152 and through a passage formed in a plate 168 mounted to the end of rod section 152. A wing nut 170 is engaged with bolt shank 166 for controlling the length of bolt shank 166 extending beyond plate 168. A second wing nut 172 is permanently fastened to shank 166 and functions as a handle to help prevent shank 166 from turning when wing nut 170 is being turned.

Figure 21:
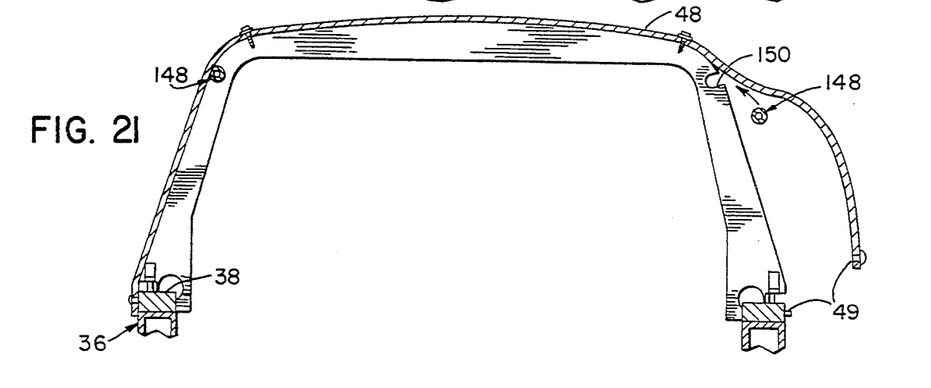
FIG. 21 is a partial section view taken along line 21—21 of FIG. 20.
Figure 22:
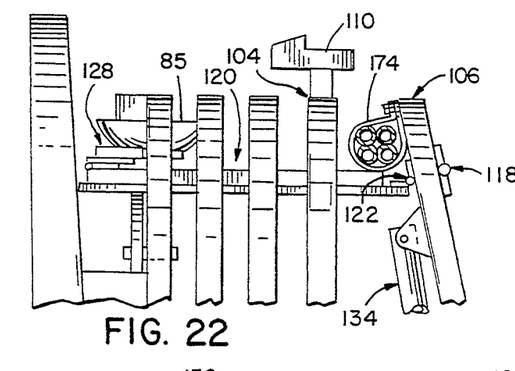
FIG. 22 is a partial enlarged side elevation view showing the components of the collapsible cap of FIG. 20 moved to their collapsed position and storage of the cover support members.
Figure 24:
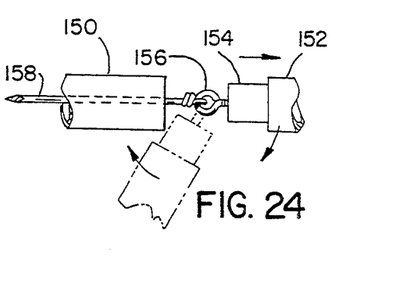

Referring to FIG. 21, support rod assembly 148 is positioned into recesses 150 in intermediate frame members 44, 46 prior to the sides of cover 48 being secured to track members 38. Nuts 170 and 172 are manipulated from the inside of cap assembly 34 to tension cover 48 after its edges have been secured to track member 38. Before collapsing cap assembly 34, support rod assemblies 148 are removed by reversing these steps, and collapsed as shown in FIG. 24. The collapsed support rod assemblies 148 are then placed within a pocket 174. Rod assemblies 148 are secured to the upper inner surface of outer rear frame member 106 by straps which may be fastened in any satisfactory manner for storage when cap assembly 34 is collapsed.

Various alternatives and embodiments are contemplated as being within the scope of the following claims particularly pointing out and distinctly claiming the subject matter regarded as the invention.

I claim:

1. A collapsible cap for use with a truck having a cab and a box extending rearwardly therefrom, the box including a pair of spaced side walls extending rearwardly from the cab and a rear wall extending between the side walls, comprising:
   a front frame member stationarily mounted adjacent the cab;
   a rear frame member movably mounted to the side walls of the box between a forward collapsed position and a rearward use position;
   at least one intermediate frame member located between the front and rear frame members;
   a collapsible cover mounted to the front and rear frame members; and
   a door movably mounted to the rear frame member, the door being movable between an operative position in which the door and the rear frame member cooperate to enclose the rearward end of the cap between the box rear wall and the cover, and an inoperative storage position in which the door is raised upwardly and forwardly relative to the rear frame member above the box side walls, wherein the door defines a laterally extending upper edge, and wherein the door is pivotably mounted along is upper edge to the rear frame member; and
   a releasable door retainer arrangement interposed between the door and the front frame member for maintaining the door in its inoperative position.

2. The collapsible cap of claim 1, wherein the releasable retainer arrangement includes one or more pivotable latch members engageable with the door upon pivoting movement of the door toward its inoperative position, wherein movement of the door past the latch members results in the latch members engaging the door when the door is in its inoperative position.

3. The collapsible cap of claim 1, further comprising a cushion member interposed between the front frame member and the door when the door is in its inoperative position.

4. A collapsible cap for use with a truck having a cab and a box extending rearwardly therefrom, the box including a pair of spaced side walls extending rearwardly from the cab and a rear wall extending between the side walls, comprising:
   a front frame member stationarily mounted adjacent the cab;
   a rear frame member movably mounted to the side walls of the box between a forward collapsed position and a rearward use position;
   at least one intermediate frame member located between the front and rear frame members;
   a collapsible cover mounted to the front and rear frame members; and
   a door movably mounted to the rear frame member, the door being movable between an operative position in which the door and the rear frame member cooperate to enclose the rearward end of the cap between the box rear wall and the cover, and an inoperative storage position in which the door is raised upwardly and forwardly relative to the rear frame member above the box side walls, wherein the door is movably mounted to the rear frame member for movement between its operative position and its inoperative position by means of a first pivotable hinge arrangement interposed between the door and a movable member mounted to the rear frame member; and
   a second pivotable hinge arrangement interposed between the rear frame member and the movable member to which the door is selectively engageable, and wherein the second pivotable hinge arrangement functions to provide movement of the door and movable member between the operative position of the door and an open position in which the door and movable member are pivoted upwardly and rearwardly to gain access to the interior of the collapsible cap.

5. A collapsible cap for use with a truck having a cab and a box extending rearwardly therefrom, the box including a pair of spaced side walls extending rearwardly from the cab and a rear wall extending between the side walls, comprising:
   a front frame member stationarily mounted adjacent the cab;
   a rear frame member movably mounted to the side walls of the box between a forward collapsed position and a rearward use position;
   at least one intermediate frame member located between the front and rear frame members;
   a collapsible cover mounted to the front and rear frame members; and
   a door pivotably mounted to the rear frame member at an edge secured to the rear frame member via a hinge, wherein the door defines a free edge movable away from the rear frame member upon pivoting movement of the door, the door being movable between an operative position in which the door and the rear frame member cooperate to enclose the rearward end of the cap between the box rear wall and the cover, add an inoperative storage position in which the door is raised upwardly and forwardly relative to the rear frame member above the box side walls, wherein the door includes a closure portion having a first edge pivotably mounted to the door so as to be pivotable onto the door to an inoperative folded position for reducing the overall length of the door when the door is moved upwardly and inwardly to its inoperative position, and wherein the closure portion further has a second edge spaced from the first edge and defining the free edge of the door.

6. A collapsible cap for use with a truck having a cab and a box extending rearwardly therefrom, the box including a pair of spaced side walls extending rearwardly from the cab and a rear wall extending between the side walls, comprising:

a front frame member stationarily mounted adjacent the cab;

a rear frame member movably mounted to the side walls of the box between a forward collapsed position and a rearward use position;

at least two intermediate frame member located between the front and rear frame members, each intermediate frame member being movable between a forward collapsed position and a rearward use position;

a collapsible cover mounted to the front and rear frame members; add a track system interposed between each side wall of the box and the rear and intermediate frame members for facilitating movement of the rear and intermediate frame members between their forward and rearward positions, the track system including an elongated track member mounted to the side wall of the box, the track member defining an upper surface, and a base mounted to each intermediate frame member and engageable with the upper surface of the track member, wherein the bases of adjacent intermediate frame members are laterally offset from each other so as to permit the intermediate frame members to move into close proximity with each other when in their forward collapsed positions, wherein each base extends along a longitudinal front-rear axis forwardly and rearwardly of each intermediate frame member;

wherein each intermediate frame member is constructed so as to provide a passage for receiving the base member of the adjacent intermediate frame members when the intermediate frame members are moved to their forward positions.

7. The collapsible cap of claim 6, wherein the front frame member and the rear frame member are constructed so as to define passages for receiving the base members when the intermediate and rear frame members are moved to their forward positions.

* * * * *